US008590740B2

(12) United States Patent
Mauger et al.

(10) Patent No.: US 8,590,740 B2
(45) Date of Patent: Nov. 26, 2013

(54) METHOD OF DRAINING A FLEXIBLE CONTAINER HOLDING A VISCOUS PRODUCT

(75) Inventors: Frédéric Mauger, Changy (FR); Julien Craplet, Lyons (FR); Fredéric Jean, Leverkusen (DE)

(73) Assignee: Rhodia Chimie, Boulogne-Billancourt (FR)

( * ) Notice: Subject to any disclaimer, the term of this patent is extended or adjusted under 35 U.S.C. 154(b) by 113 days.

(21) Appl. No.: 12/564,144

(22) Filed: Sep. 22, 2009

(65) Prior Publication Data

US 2010/0006594 A1 Jan. 14, 2010

Related U.S. Application Data

(62) Division of application No. 10/544,375, filed as application No. PCT/FR2004/050039 on Feb. 3, 2004, now Pat. No. 8,157,127.

(30) Foreign Application Priority Data

Feb. 13, 2003 (FR) ..................................... 03 01724
Jun. 30, 2003 (FR) ..................................... 03 07872

(51) Int. Cl.
*G01F 11/00* (2006.01)

(52) U.S. Cl.
USPC .................................. 222/1; 222/102; 222/95

(58) Field of Classification Search
USPC ............................ 222/95–103, 107, 1, 181.2
See application file for complete search history.

(56) References Cited

U.S. PATENT DOCUMENTS

| | | | | |
|---|---|---|---|---|
| 3,720,240 A | | 3/1973 | Gardner | 141/9 |
| 4,639,251 A | * | 1/1987 | Kirkland | 604/260 |
| 5,490,613 A | * | 2/1996 | Taylor et al. | 222/102 |
| 5,529,769 A | | 6/1996 | Cho et al. | 424/74 |

(Continued)

FOREIGN PATENT DOCUMENTS

| | | |
|---|---|---|
| DE | 44 16 089 | 10/1995 |
| EP | 0 246 052 | 11/1987 |

(Continued)

OTHER PUBLICATIONS

A2—Fluid Bag Information. "A Fluid-Bag Container for Every Liquid."

(Continued)

*Primary Examiner* — Paul R Durand
*Assistant Examiner* — Robert Nichols, II
(74) *Attorney, Agent, or Firm* — James C. Lydon

(57) ABSTRACT

A method and kit for draining a flexible container holding a product having a viscosity of between 10 Pa·s and 200 000 Pa·s. The method includes using a flexible container (3); optionally, moving the container (3) to be drained to a drainage site; ensuring the viscous product (2) can flow from container (3) through at least one outlet (9); exerting a pressure on at least one defined area of container (3) using a pressurizing device which preferably includes at least one pressure member (5) and/or a pressure fluid to maintain container (3) in an inflated or partially-inflated state; and removing the pressure once the container has been drained. The drainage kit includes the viscous product (silicon mastic), a flexible container (3) and a draining device including at least one pressure member and/or pressure fluid.

22 Claims, 4 Drawing Sheets

(56) References Cited

U.S. PATENT DOCUMENTS

| | | | | | |
|---|---|---|---|---|---|
| 5,690,253 | A * | 11/1997 | LaFleur | 222/102 |
| 5,765,723 | A * | 6/1998 | Wilcox | 222/1 |
| 6,076,457 | A | 6/2000 | Vallot | 100/290 |
| 6,158,628 | A | 12/2000 | Englram et al. | 222/389 |
| 6,196,420 | B1 | 3/2001 | Gutierrez et al. | 222/101 |
| 6,880,735 | B2 * | 4/2005 | Whitney | 222/539 |
| 7,101,624 | B2 | 9/2006 | Bradley | 428/411.1 |
| 2006/0249535 | A1 | 11/2006 | Mauger et al. | 222/95 |
| 2007/0080167 | A1 * | 4/2007 | Baker et al. | 222/102 |
| 2007/0138202 | A1 * | 6/2007 | Evers | 222/95 |
| 2009/0302057 | A1 * | 12/2009 | Matzel | 222/102 |

FOREIGN PATENT DOCUMENTS

| | | |
|---|---|---|
| EP | 0 648 708 | 4/1995 |
| EP | 0 812 801 | 12/1997 |
| EP | 0 839 758 | 5/1998 |
| EP | 1 097 899 | 5/2001 |
| GB | 2 159 583 | 12/1985 |
| WO | WO 92/18419 | 10/1992 |

OTHER PUBLICATIONS

A3—"Mjukeseg bulksack smark spargis," Magazine Transport Idag, with partial English translation.

A4—Magazine Kunnosapito. "Alentaa" with partial English translation.

A5—Scanpack '94 Goteborg Invoice (Oct. 26, 1994).

A6—Pack it 1995, Messe Basel (Nov. 23, 1994).

A7-1—Fluid-Bag Sales Documents.

A7-2—Fluid-Bag Product Information (Feb. 2006).

A7-3—Fluid-Bag Product Information (Mar. 2007).

A14—Wikipedia excerpts "NLG1Grade" and "Viscosity" (Sep. 28, 1993).

* cited by examiner

METHOD OF DRAINING A FLEXIBLE CONTAINER HOLDING A VISCOUS PRODUCT

This application is a division of U.S. application Ser. No. 10/544,375, filed on Jun. 19, 2006, now U.S. Pat. No. 8,157,127, which is the National Stage of International Application No. PCT/FR2004/050039, filed Feb. 3, 2004.

The present invention relates to a method of continuously or discontinuously draining viscous products contained in flexible containers, particularly of the big-bag type, this drainage taking place through an opening provided in the lower part of the flexible container.

The invention also relates to a drainage kit, including in particular a device for draining viscous products contained in flexible containers.

The viscous products which the invention concerns are more especially products whose viscosity is at least 10 Pa·s, and preferably between 10 and 200,000 Pa·s, this viscosity being measured in the manner known per se at 25° C. and with a shear gradient of 0.01. $s^{-1}$, i.e. silicone oils, silicone gums, polyorganosiloxane compositions (optionally in the form of aqueous emulsions) which can be crosslinked to form elastomers by polyaddition, polycondensation or dehydro(poly)condensation reactions, organic polymers comprising reactive organosilicic groups (referred to as MS polymers) and compositions which are charged in a solvent or aqueous medium, comprise an acrylic polymer and can be crosslinked to form elastomers by drying. They may in particular be silicone putties or other viscous polymeric products such as polyurethanes or viscous inks.

Such viscous products can be bulk-stored in flexible containers of the big-bag type, before being poured or injected into other containers or before being packaged in other packaging.

The high viscosity of these paste-like products is naturally a significant technical constraint in terms of draining them or transferring them between containers.

In a field similar to that of the invention, namely the field of low-flow granular/powdered materials, patent application DE-A-34 29 167 describes a method and a device for draining flexible containers for particulate products in bulk. According to this document, the flexible container of the big-bag type is, on the one hand, suspended using handles with which it is equipped and, on the other hand, housed in a hopper which is shaken by means of an eccentric foot that can move in rotation and two other feet mounted on springs. This vibrational draining device does not seem suitable for viscous products contained in flexible bags.

Also known are techniques for draining rigid barrels of viscous products with the aid of a barrel press comprising a pressure plate intended to penetrate into and be moved in a barrel, in order to expel under pressure the viscous product contained in a thin plastic bag, for example made of polyethylene.

There are also ways of draining extrudates containing a viscous silicone product with the aid of a device formed by a tube, which is intended to receive the extrudate and in which a piston for pressurizing the viscous product can move, thus allowing it to be expelled out of the tube.

The broad technological background furthermore includes systems for draining containers consisting of a rigid cardboard box containing a thin polyethylene bag charged with viscous products. This type of container is drained with the aid of a pressure plate which can expel the viscous product out of the polyethylene bag, said viscous product being subsequently collected by pumps provided for this purpose, before being conveyed to downstream elements.

These last three known technologies lie outside the scope of the invention, which concerns the draining of flexible containers of the big-bag type other than the specialist and complicated containers used in these technologies (barrels, tanks, steel containers or special cardboards).

In this context, it is an essential object of the present invention to provide a method of draining flexible containers for viscous products, which method should be easy to use and economical.

It is another essential object of the invention to provide a method of draining flexible containers for viscous products with a capacity greater than or equal to 250 liters.

It is another essential object of the present invention to provide a method of draining flexible containers for viscous products, which is simple, economical, leads to little material losses, for example less than or equal to 1.5%, or even 0.8%, and which requires very little or no cleaning of the equipment used.

It is another essential object of the present invention to provide a kit for draining flexible containers of the big-bag type for viscous products, which has a simple and economical structure, makes it possible to drain flexible bags with a capacity greater than or equal to 250 liters, is simple to use, generates very little material losses (less than or equal to 1.5%) and requires little or no cleaning.

It is another essential object of the invention to provide a kit for draining flexible containers for viscous products, in which the flexible container responds optimally to the industrial requirements of transport and logistics.

These objects, inter alia, are achieved by the present invention which relates firstly to a method of draining a flexible container holding a viscous product, characterized by the following points:

- the viscous product is selected from the group of products whose viscosity is at least 10 Pa·s, and preferably between 10 and 200,000 Pa·s,
- i.e. silicone oils, silicone gums, polyorganosiloxane compositions (optionally in the form of aqueous emulsions) which can be crosslinked to form elastomers by polyaddition, polycondensation or dehydro(poly)condensation reactions, organic polymers comprising reactive organosilicic groups (referred to as MS polymers) and compositions which are charged in a solvent or aqueous medium, comprise an acrylic polymer and can be crosslinked to form elastomers by drying;
- it consists essentially in:
  - using a flexible container;
  - optionally moving the container to be drained from its storage site to a drainage site;
  - ensuring that at least one outlet opening, preferably arranged in the lower part of the container, allows the viscous product to flow out of the container;
  - exerting a pressure on at least one delimited region of the flexible container with the aid of pressurization means, which preferably consist of at least one pressure member and/or a pressure fluid, so as on the one hand to keep the container in the inflated or partially inflated state and, on the other hand, to accelerate the flow;
  - depressurizing at the end of draining.

The inventors have succeeded in developing a methodology for draining flexible containers for viscous products making it possible to obviate the conventional containers, which are inconvenient, bulky and complicated.

The characteristic of keeping the container or flexible bag in the at least partially inflated state makes it possible, inter alia, to overcome the problem of the outlet orifice being obstructed by conventional lining bags, the problem of contaminating the material and the problem of material loss; the latter problem being at least partly resolved by the technique according to the invention which allows compression into pleats (or as a concertina) minimizing the material loss.

Another benefit of the method of the invention is that it is possible to use containers whose capacity is more than 250 liters, for example 1000 liters, which leads to significant productivity gains in terms of both filling and draining the viscous products.

It should be noted that all the viscosity values used in the present specification correspond to a viscosity measured in the manner known per se at 25° C. and with a shear gradient of $0.01 \cdot s^{-1}$.

One of the essential characteristics of the invention is therefore the use of a flexible container, for example of the big-bag type. It is advantageously a container whose wall, while being flexible, is nevertheless still mechanically strong and moreover, preferably, has leaktightness properties vis-à-vis the viscous product in question.

According to a preferred characteristic of the invention, this wall essentially consists:

of at least one element which provides the mechanical strength and includes one or more sheets of materials which are identical or different to one another, preferably of fabric;

and optionally of at least one sealing element formed (i) by at least one polymer film, preferably in the form of a coating and/or (2i) of at least one leaktight lining bag composed of one or more layers of materials selected from the group comprising: synthetic polymer films (in particular polyolefins (and even more preferably polyethylenes, polypropylenes), polyesters or polyamides) or metals (in particular aluminum); the lining bag(s) being at least partially secured to the wall element providing the mechanical strength, and even more preferably at least partly adhesively bonded and/or stitched onto said element.

This container, formed by such a flexible envelope, is sufficient packaging in terms of protecting the viscous product. It is self-contained packaging which can be transported easily, for example simply by being placed on a palette and secured, or alternatively included in other containers which are not involved in the draining method, in contrast to thin polyethylene bags which are housed in the known way in rigid containers used for both transporting them and draining them.

The flexible-envelope container used in the method according to the invention may, for example, be a fabric (e.g. polypropylene) bag lined with a thin, for example multilayered bag (polyethy-lene/aluminum/polyethylene terephthalate) adhesively bonded and/or stitched to the fabric, said container being optionally and advantageously provided with handles allowing it to be suspended and manipulated with a hoist or a forklift truck.

These flexible containers or big-bags may have large capacities, for example between 500 and 2,000 liters.

The flexible-envelope container may advantageously be disposable, particularly in terms of transport and storage. For example, this makes it possible to avoid complicated supply-chain rotations of metal containers.

Products whose viscosity is of the order of 3000 Pa·s, for example silicone putties, may be mentioned as examples of viscous products according to the invention.

The method according to the invention offers a wide range of drainage rates, which can be obtained by varying the outlet diameter or the pressure value exerted as a function of the viscosity of the product in question.

The desired cleaning economy is obtained by virtue of minimizing the surface areas of material in contact with the product during the method.

According to a beneficial characteristic of the method according to the invention, the outlet opening(s) of the container is or are obtained:

by cutting out the wall of the container;

and/or by removing plugs(s) or capsules fitted to one or more orifice(s), in which case said orifice(s) may be provided with spout(s) for draining the wall of the container;

and/or by removing tie(s) closing opening(s) already provided on the container.

In practice, it is therefore possible to cut out part of the wall of the flexible container or spouts with which it may be equipped, or alternatively to undo the ties and/or knots closing an opening.

According to a first embodiment of the method according to the invention, a draining device is provided comprising, on the one hand, at least one pressure member having at least one piston and, on the other hand, at least one drainage vessel which is intended to receive the flexible container to be drained, or optionally only its lining bag, and is designed as a female part capable of interacting and acting as a guide for the piston of the pressure member as it moves, particularly in the forward direction corresponding to pressurization of the flexible container or optionally only its lining bag.

According to a variant of this first embodiment:

the drainage vessel is designed so that it can be (hermetically) closed and the piston can be moved under the action of a pressure fluid.

In the context of this variant, it may be advantageous according to the invention to use a pressure fluid contained in an inflatable jack, this jack being housed between the piston (5.1) and a reversible closure lid of the vessel (6) and connected to pressure fluid supply means for inflating it and consequently moving the piston (5.1), in order to make it possible to expel the viscous product (2) out of the vessel (6).

According to a second embodiment of the method according to the invention:

a draining device is provided which comprises at least one pressurizable drainage vessel intended to receive the flexible container to be drained, or optionally only its lining bag and this vessel is pressurized by means of a pressure fluid so as to expel the liquid product out of the vessel.

According to a third embodiment of the method according to the invention, a draining device is provided which comprises:

on the one hand, at least one pressure member having at least one set of at least one roller and at least one counter-roller element, preferably at least two substantially parallel rollers which can move in rotation about their respective axes and, on the other hand, means for suspending the flexible container so that the opening(s) is (are) arranged at the bottom;

the assembly being designed so that the two rollers can move in the downward direction while rolling and compressing the flexible container as it moves between these two rollers, the latter being optionally drivable in rotation by at least one motor, this mechanization being optionally combined with or replaced by preferably motorized upward traction of the suspended flexible container.

The fluid used in the variant of the first embodiment and in the second embodiment may be a gas or a liquid. It may be a liquid having a viscosity of less than or equal to 50 Pa·s. Water might be entirely suitable for this purpose.

Although the method according to the invention functions without mechanical collection of the viscous product at the outlet of the container, it is entirely feasible to provide boosting by mechanical elements (for example: pumps, screws, double screws) for the viscous product being expelled, in the event that transport is necessary over a large distance or through conduits generating large pressure drops, or alternatively in order to derive an economic advantage from this.

According to one embodiment, the drained viscous product may be conveyed to storage means or packaging means.

According to one advantageous version of the invention, the viscous product expelled from the flexible container, or optionally only from its lining bag, is thus fed to at least one assembly for packaging said product in suitable packaging, at a suitable flow rate greater than or equal to the consumption of the packaging assembly.

Although the flow rate is advantageously as high as possible in the case of simple drainage (for example more than 50 liters per minute for a viscous product of 1000 Pa·s) so as to provide maximum productivity, in the case of feeding a packager it is desirable to be able to provide high instantaneous flow rates (which may for example be more than 1 liter per minute). The flow rate naturally depends on all the parameters of Poiseuille's law (viscosity, pressure difference, geometry of the outlet conduit) and on the elements impeding the outlet of the viscous product: valves, filters, roughness.

For illustration, it may be mentioned that the packaging assembly could in particular be a device for cartridging viscous products, in particular silicone putties ("cartridger") at a suitable flow rate at least equal to the consumption of the packaging assembly.

According to another advantageous version of the invention, the viscous product expelled from the flexible container, or optionally only from its lining bag, is fed to means for storing the viscous product and/or mechanical means for moving the viscous product in order to increase its flow rate, said mechanical means preferably being selected from the group comprising: pumps, (double) screws.

Naturally, the method according to the invention is not limited with respect to the number of draining devices and means arranged downstream for packaging, storage or mechanical collection.

The method according to the invention consists in exploiting the flexibility of the container holding the viscous product, by applying a pressure on the wall of this flexible container which is almost entirely transmitted to the viscous product so that the container is kept in an at least partially inflated state and the viscous product is expelled. This continuous or discontinuous expulsion of the viscous product takes place through an opening made in the flexible container (for example by cutting, unscrewing a plug, through a drainage spout), or alternatively through one or more openings provided in the means or the associated elements downstream of the draining device. The inflated state of the flexible container which results from the pressure exerted on only a part of its surface makes it possible to keep a permanent tension in the wall of the container and thus eliminate the risk of random folding liable to obstruct the opening through which the viscous product emerges.

The pressure exerted is, for example, between 1 and 6 bar in the case of direct drainage, while it is adjusted so that the outlet rate of the viscous product is greater than or equal to the consumption of the means of the elements arranged downstream of the device.

At the end of drainage, whether it is partial or complete, depressurization of the flexible container (and therefore the product) is carried out according to the invention.

In the case when the container to be drained has a storage site other than the drainage site, the flexible container and any remaining viscous product which it contains is returned to a storage site. This optional operation is fast enough for it to be possible to drain another viscous product, incompatible with the previous one, after a time of e.g. no more than ten minutes counted from the end of drainage of the previous product to the start of drainage of the next product.

The method according to the invention involves:
- control or design of the flexible container so that its dimensions and properties are well-suited to the drainage conditions;
- transfer of the flexible container from its storage site and/or its transport containment to the drainage location;
- compression of the flexible container during its drainage so to minimize the loss of material and avoid the risk of obstructing the outlet orifice;
- strength of the flexible container, so that it does not yield under the pressure;
- values of the pressure and flow rate parameters during drainage;
- the changeover time between two incompatible viscous products;
- and the route traveled by the viscous product so that it contaminates only a minimal number of elements that subsequently need to be cleaned, and if possible only disposable or replaceable elements (such as the flexible container and/or its disposable lining bag as well as the flexible connecting tubes which need to be replaced when changing from one viscous product to others).

According to another of its aspects, the present invention relates to a kit for carrying out the method defined above, which kit being characterized in that it comprises:
- a viscous product selected from the group of products whose viscosity is greater than or equal to 10 Pa·s, preferably between 10 Pa·s and 200,000 Pa·s,
  - i.e. silicone oils, silicone gums, polyorganosiloxane compositions (optionally in the form of aqueous emulsions) which can be crosslinked to form elastomers by polyaddition, polycondensation or dehydro (poly)condensation reactions, organic polymers comprising reactive organosilicic groups (referred to as MS polymers) and compositions which are charged in a solvent or aqueous medium, comprise an acrylic polymer and can be crosslinked to form elastomers by drying;
- a mechanically strong flexible container which is leaktight for the viscous product, preferably equipped with handles for lifting and/or suspension;
- a draining device comprising at least one pressure member and/or at least one pressure fluid;
- optionally at least one assembly for packaging the viscous product in suitable packaging;
- optionally mechanical means for moving the viscous product in order to increase its flow rate, said mechanical means preferably being selected from the group comprising: pumps, (double) screws;
- and optionally storage means.

According to one advantageous characteristic of the invention, the flexible container preferably comprises a wall consisting:

of at least one element which provides the mechanical strength and includes one or more sheets of materials which are identical or different to one another, preferably of fabric;

and optionally of at least one sealing element formed (i) by at least one polymer film, preferably in the form of a coating and/or (2i) of at least one leaktight lining bag composed of one or more layers of materials selected from the group comprising: synthetic polymer films (in particular polyolefins—and more preferably polyethylenes, polypropylenes—polyesters or polyamides) or metals (in particular aluminum); the lining bag(s), when employed, being at least partially secured to the wall element providing the mechanical strength, this (or these) bag(s) and preferably at least partly adhesively bonded and/or stitched onto said element.

Even more preferably, the flexible container has a mechanically strong and leaktight wall made on the basis of fabric(s) whose weight in the uncoated state lies in the interval ranging from 100 to 300 $g/m^2$, and the lining bag has a thickness lying in the interval ranging from 5 to 500 microns.

In practice, it may be a polypropylene fabric with a density equal to 150-300 $g/m^2$ for a 1000 liter container.

The lining bag is, for example, adhesively bonded or stitched inside or outside the mechanically strong wall. This thin lining bag may have a thickness of between 10 and 250 microns. It should be noted that the fabric thicknesses of the wall and the lining bag depend on the mechanical strength and the physicochemical protection which are desired.

Optionally, the flexible container is provided with one or more drainage spouts, with a structure identical or different to that of the flexible container.

Naturally, each spout optionally provided on the flexible container may be used for draining or filling said container and may furthermore act as a closure of an opening, for example using a plug or a knotted tie. This plug may consist of a weld and/or an adhesive joint.

Each optional spout may furthermore constitute an element for connecting the flexible container to a downstream storage site for mechanical collection or packaging.

According to an advantageous embodiment, the flexible container has at least one large opening or so-called full opening to facilitate filling. This large opening may be closed by welding and/or by a knot and/or by an adhesive joint. It is preferable for such a large opening to be used only for filling, in contrast to the openings and/or drainage spouts as described above.

According to a first embodiment, the draining device comprises, on the one hand, at least one pressure member having at least one piston and, on the other hand, at least one drainage vessel which is intended to receive the flexible container to be drained and is designed as a female part for the male part constituted by the piston of the pressure member as it moves, particularly in the forward direction corresponding to pressurization of the flexible container or only its lining bag.

Even more preferably in this first embodiment, the draining device is such that:

the piston of the pressure member has a (preferably circular) head connected to a stem intended to interact with a fixed jack for driving in reciprocating translational movement, said jack being mounted on a fixed structure, said head being intended to penetrate into the draining vessel in order to compress the flexible container;

and the drainage vessel, which comprises at least one outlet opening for the viscous product and which is optionally equipped with movement means (preferably rollers), preferably consists of a hollow cylinder which is intended to receive the flexible container and in which the head of the piston can slide, this head preferably being circular and with a diameter sufficiently close to the interior diameter of the vessel so that leaktightness vis-à-vis the viscous product can be ensured, advantageously with the aid of a peripheral O-ring seal bearing on the preferably chamfered edge of the head of the piston and on the interior wall of the vessel.

According to a variant of this first embodiment, the drainage vessel is designed so that it can be (hermetically) closed and the piston can be moved under the action of a pressure fluid.

In the scope of this variant, according to the invention it is advantageous for the draining device to comprise an inflatable jack, which is housed between the piston and a reversible closure lid of the vessel and connected to pressure fluid supply means for inflating it and consequently moving the piston, in order to make it possible to expel the viscous product out of the vessel.

Preferably, the pressure fluid supply means comprise at least one pressure fluid reservoir, means for conveying the pressure fluid and a pipe, which is equipped with these means and connects the pressure fluid reservoir to the inflatable jack.

In practice, the pressure fluid is selected e.g. from the group of incompressible fluids, preferably from the subgroup comprising water or oil, or from the group of compressible fluids, air being preferred.

According to a second embodiment, the draining device comprises least one drainage vessel which is intended to receive the flexible container to be drained, or optionally only its lining bag, and can be pressurized by means of a pressure fluid so as to expel the viscous product out of the vessel.

In the variant of the first embodiment and in the second embodiment, the partial pressure exerted on the flexible container results (indirectly and directly, respectively) from a pressure fluid consisting of any liquid or gaseous fluid, advantageously liquid, with a pressure of less than 50 Pa·s. This assumes that the drainage vessel is designed like an autoclave provided with at least one orifice which can be opened or closed and is used to introduce and/or release the pressure fluid. Naturally, this autoclave drainage vessel also comprises at least one drainage opening for the viscous product.

According to a third embodiment, the draining device comprises, on the one hand, a pressure member having at least one set of at least one roller and at least one counter-roller element, preferably at least two substantially parallel rollers which can move in rotation about their respective axes and, on the other hand, means for suspending the flexible container so that the opening(s) is (are) arranged at the bottom; the assembly being designed so that the two rollers can move in the downward direction while rolling and compressing the flexible container as it moves between these two rollers, the latter being optionally drivable in rotation by at least one motor, this mechanization being optionally combined with or replaced by preferably motorized upward traction of the suspended flexible container.

Even more preferably, the draining device of this third embodiment is such that:

the flexible container is equipped in its upper part with at least one gripping handle for suspending it and, in its lower part, with at least one outlet opening for the viscous product, optionally provided with a spout, the container advantageously having an overall pear shape whose flared part forms the base;

and the two rollers, which may or may not be motorized, are intended to be arranged on either side of the flexible container so as to squeeze it while moving in the downward direction, said set of rollers being provided with a system for regulating the inter-axial distance so as to adapt the squeezing level of the flexible container.

In the first and second embodiments, according to which a drainage vessel forms the device according to the invention, it is preferable for the dimensions of the flexible container and optionally of its lining bag, taken separately, to be selected so that the container is kept in the inflated or partially inflated state during the pressurization. Only the flexible container and/or its lining bag are therefore kept under tension, which limits the risks of undesirable folding which may lead to obstruction of the drainage opening or openings. Thus, assuming that the drainage vessel and the flexible container and/or the lining bag have substantially the same shape, it is preferable for the dimensions of the flexible container and/or of the lining bag to be smaller than those of the vessel in a proportion of from 2 to 15%.

In the third embodiment, the counter-roller may optionally be a plate associated with one or more rollers. Without implying any limitation, the plate may also be replaced by a flat support which, for example, may be a vertical wall or a horizontal plane (the floor).

In the case when a plate and two rollers are used, it is feasible for one of the rollers to bear on one of the faces of the plate and for the other roller to bear on the other face of the plate, the flexible container being intended to be inserted between one of the rollers and the plate. This arrangement makes it possible to balance the forces.

According to another advantageous characteristic of the invention, the flexible container and/or its lining bag have no surface irregularity in the substantially vertical direction (for example vertical stitching or vertical bulging or vertical bumps) over at least a part of their height, so that the contact of the flexible container and/or its lining bag with the interior face of the drainage vessel creates a substantially toric junction region forming a barrier to the viscous products. This makes it possible to prevent migration of the viscous product between the inner face of the vessel and the upper part of the wall of the flexible container and/or of the lining bag during drainage, so that the interior of the vessel is not substantially contaminated by the viscous product.

The method and the drainage kit according to the invention will be understood more clearly in light of the following description, given by way of nonlimiting examples, of two advantageous embodiments of said drainage kit, with certain variants, referring to the appended drawings in which.

Figure 1:
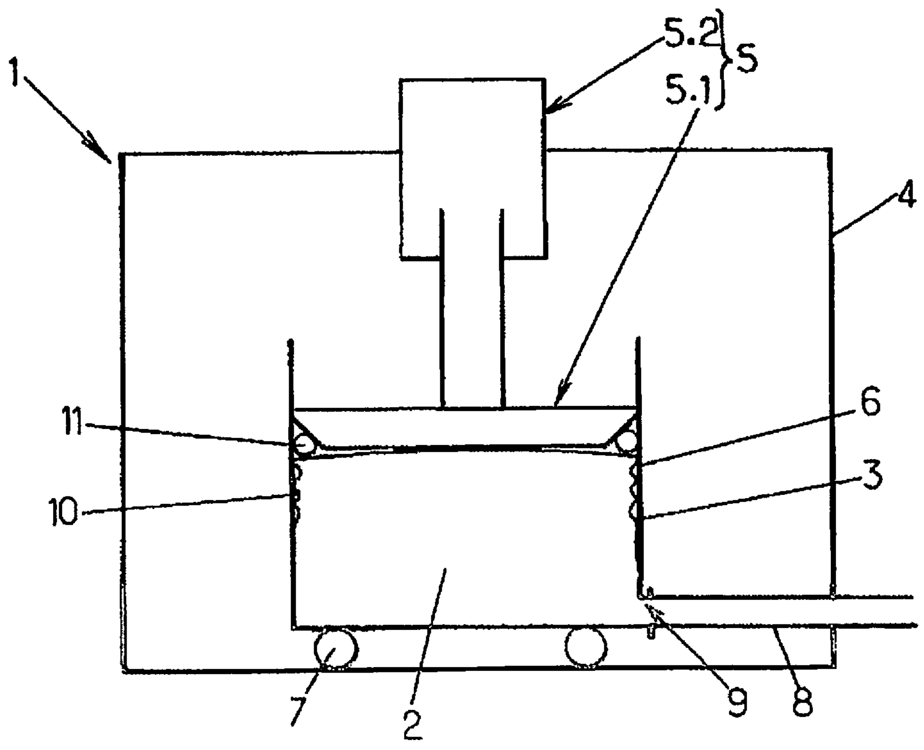
FIG. 1 represents a summary diagram of an embodiment of the drainage kit according to the invention.

FIG. 1 shows a kit for draining viscous products (viscosity ≥50 Pa·s: for example 3000 Pa·s silicone putty) comprising a device 1 for draining a viscous product 2 included in a flexible container 3.

The draining device 1 comprises a structure or frame 4 on which a jack 5 comprising a piston 5.1 and a jack body 5.2 is fixed. The latter is used to actuate the pressure piston 5.1. The latter has a maximum exterior diameter slightly smaller than the minimum interior diameter of the vessel (from 0.1 to 2.5% less).

The drainage vessel 6, equipped with rollers 7, constitutes another element of the draining device 1. This drainage vessel 6, which is open and has a flat-bottomed cylindrical overall shape, also has an outlet conduit 8 for the viscous product 2 in its lower part. It is pressure resistant and the presence of rollers 7 makes it easy to move.

The flexible container 3 is housed inside the drainage vessel 6. This flexible container 3 has a drainage opening 9 formed in its lower part and arranged facing the outlet conduit 8 of the drainage vessel 6. This drainage opening 9 is made just before the pressurization by the pressure member—5, 5.1, 5.2—and after having transported the flexible container 3 from its storage site and/or transport to the drainage site defined by the drainage vessel 6.

The flexible container 3 has an envelope 10 which may consist:

either of a multiple layer of mechanically strong walls (for example made of polypropylene fabric)/thin polyethylene bags optionally stitched and/or adhesively bonded inside the fabric wall;

or by the lining bag only after having extracted it from inside the flexible container 3. Details of the structure of this envelope 10 will be given in more detail in FIG. 2 described below.

The flexible container 3 should be designed so as to ensure minimal loss of material, in particular less than 2%.

The flexible container 3 is preferably a container of the big-bag type with a cylindrical bottom, without vertical stitching, the diameter of which is slightly less than that of the drainage vessel 6 so that the inflation experienced by this flexible container when it is pressurized keeps the wall of the flexible container 2 under tension during drainage. In the case in point, this wall consists of a polypropylene fabric having an adhesively bonded inner layer formed by a thin adhesively bonded polyethylene lining. This type of mechanically strong wall has a protective role during transport and storage, while its inner layer (inliner) ensures leaktightness during drainage, so that the viscous product flows only through the drainage opening of the envelope of the flexible container when it is pressurized.

The leaktightness between the piston head 5.1 (pressure member) and the inner face of the drainage vessel 6 is provided by an O-ring seal 11 which forms a barrier against migration of the viscous product 2 above the piston head 5.1. The O-ring seal 11 has, for example, a cross section with a diameter equal to 50 mm plus or minus 20 mm, and its length is equal to the perimeter of the interior of the drainage vessel 6 so that, by adjusting the compressibility of the material forming the O-ring seal 11, preferably elastomeric material, continuity of this O-ring seal 11 is ensured. It is housed in the space delimited by an annular region of the inner face of the cylindrical drainage vessel 6 and by the chamfered face of the piston 5.1 (45° chamfer). This chamfer is used to exert an oblique force on the elastomeric O-ring seal 11 so that it is perfectly pressed against the inner face of the vessel in order to provide good leaktightness.

The flexible container may, for example, be transported from its storage site to the drainage side by means of a forklift truck or a mobile hoist. In order to do this, it is preferable for the flexible container to have, for example, one or more strong handles allowing it to be lifted by the transport means.

According to one variant, the outlet conduit 8 could be arranged on the piston head 5.1. This outlet conduit 8 allows the viscous fluid to be expelled out of the vessel for 2.2 drainage 6 because of the pressure difference between the interior of the flexible container 3 and the external pressure. The diameter of this outlet conduit is, for example, 76 mm.

This outlet conduit 8 may comprise a hose making it possible to transport the viscous product 2 onto means for packaging, storage or mechanical collection arranged downstream. This hose is advantageously removable so that it can be changed for each product to be drained.

According to other variants, a plurality of outlet orifices could be provided in order to distribute the viscous product 2 over a plurality of means for packaging, storage or mechanical collection.

According to the flow rate absorbed by the receiver downstream of the outlet conduit/hose 8 (for example a packager (e.g. cartridger), a collection pump, a mixing screw, a container under a particular pressure or under atmospheric pressure), and according to the dimensions of the elements of the downstream receiver through which it passes, a certain pressure is available at the outlet 8. This pressure is less than or equal to that to which the viscous product 2 is subjected in the flexible container 3.

Owing to the pressurization assembly 5 (piston 5.1 and jack 5.2), it is possible to impose a pressure on the flexible container which is commensurately greater as the product 2 is viscous (for example up to 6.5 bar without technical difficulties) and the required flow rate is high. By employing in particular the empirical Poiseuille law, to a first approximation, the product 2 contained in the flexible container 3 is therefore subjected to a pressure $P=(8 \cdot Q \cdot N \cdot L)/\pi \cdot R^4$, with P=relative pressure with respect to atmospheric pressure in pascals, Q=desired volumetric flow rate in $m^3/s$, N=dynamic viscosity of the product in Pa·s, L=equals length of the outlet conduit 8 in meters and R=radius of said conduit 8.

According to the method according to the invention, the deformation of the flexible container during drainage is controlled so that the container does not tear and folds optimally without obstructing the outlet orifice 9.

The volumetric flow rates are measured from the mass which has flowed in a given time and the density of the viscous product 2.

In order to form the outlet opening 9, several possibilities are available to the person skilled in the art:

- Piercing the flexible container 2 with a cutting tool (for example a knife blade) by introducing the tool through the outlet conduit 8. This piercing is a advantageously carried out when the flexible container 2 is not yet under pressure, while taking the necessary precautions for positioning the hole to be pierced.
- Using a drainage spout forming an integral part of the flexible container 2 (a spout which may previously have been used as a filling spout), this spout being opened by cutting its closed end, for example, in which case said spout may advantageously be threaded into the outlet conduit 8, the connection of this spout to the outlet conduit 8 being a routine operation within the scope of the person skilled in the art.
- Opening a plug provided on the flexible container 2, with the option of connecting a drainage spout onto the neck released by removing the plug; it may also be conceivable to connect the outlet conduit 8 directly onto the neck released by removing the plug.

Figure 2:
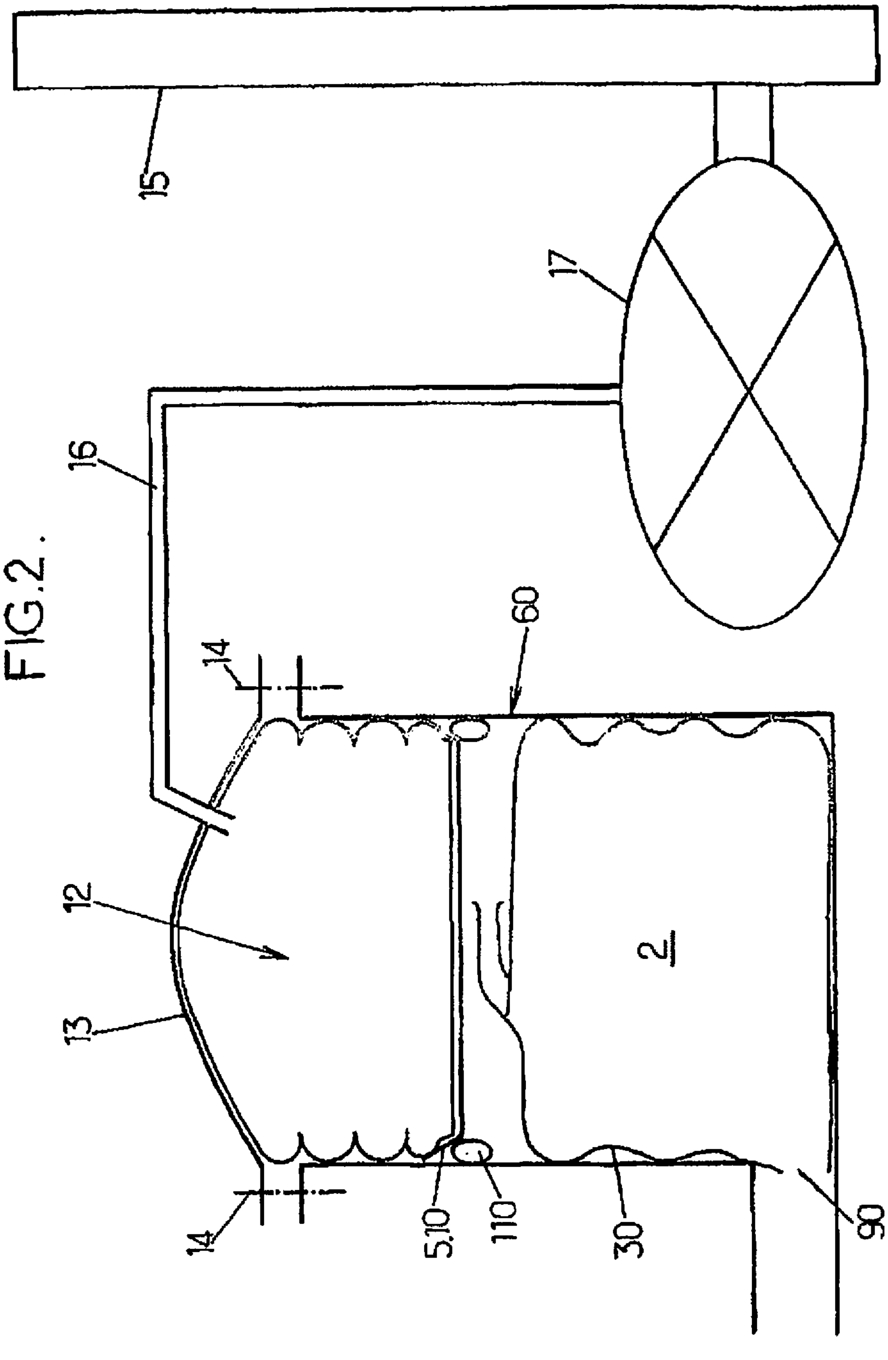
FIG. 2 represents a summary diagram of a variant of the embodiment according to FIG. 1.

FIG. 2 shows a device similar to that in FIG. 1 as described above, in which the pressure fluid for carrying out the pressurization is contained in a flexible inflatable jack 12 housed in the drainage vessel 60, between a separating plate forming a piston 5.10 and a lid 13. The latter may be fixed reversibly to the top of the drainage vessel 60 by using reversible securing means 14 represented symbolically in FIG. 2. These means 14 are, for example, bolts.

The flexible inflatable jack 12 may, for example, be of the type marketed by PRONAL.

The drainage vessel 60 may, for example, be a stainless steel vessel with a capacity of e.g. 1000 liters.

On the opposite side from the flexible inflatable jack 12 relative to the separating plate/piston 5.10, the drainage vessel 60 contains a flexible container 30 of viscous product 2 in its lower part. The bottom of the flexible container has a drainage opening 90. In the same way as for the embodiment according to FIG. 1, this drainage opening 90 is made in the flexible container 30 just before the pressurization with the aid of the flexible inflatable jack 12.

An elastomeric seal 110 is interposed between the separating plate/piston 5.10. This elastomeric seal 110 is an O-ring seal which fulfils the same function as the one referenced 11 in FIG. 1 as described above. Leaktightness on either side of the piston plate 5.10 is thus provided vis-à-vis the viscous product 2 contained in the flexible container 30.

The flexible inflatable jack 12 is connected to a pressure fluid reservoir 16 by means of a pipe 17 equipped with conveying means 17.

According to the invention, the pressure fluid may be an incompressible fluid, i.e. a liquid such as water or oil, alternatively a compressible fluid such as air.

In the event that it is an incompressible fluid, for example water or oil, the means 17 for conveying the fluid contained in the reservoir 15 to the flexible inflatable jack 12 via the pipe 16 consist, for example, of a suitable pump. When the pressure fluid is formed by compressed air, said conveying means 17 correspond to a compressed air circuit having all the suitable components which are known per se (valve, tap, etc.).

The pressure fluid is preferably an incompressible fluid such as oil or water. It is then preferable to provide a cushion filled with a compressible gas (for example air) in the flexible inflatable jack 12. Such a cushion behaves as a buffer making it possible to smooth the flow rate of the fluid and to limit or even eliminate the lag time of the flow of the viscous product to the opening of the drainage vessel.

The benefit of using a flexible inflatable jack 12 is manifested particularly in economic terms and in terms of simplicity of use. This inflatable jack 12 furthermore does not add any encumbrance additional to the drainage vessel. It is therefore readily conceivable to use a double system making it possible to operate during the waiting times, which leads to significant productivity gains.

Another advantage offered by the variant of FIG. 2 is connected with the ease and speed of assembling and disassembling such a device.

According to an optional, but nevertheless beneficial characteristic of the device according to FIG. 2, the lid 13 or even the drainage vessel 60 is equipped with a safety valve for releasing air overpressures.

In the same way as for the device of FIG. 1, the device of FIG. 2 is, for example, arranged upstream of means for packaging the viscous product, for example in cartridges.

The operation of this draining device of FIG. 2 is very simple. The flexible jack 12 is inflated with the aid of the conveying means 17 as a function of the pressure required to expel the viscous product contained in the flexible container 30.

Figure 3:
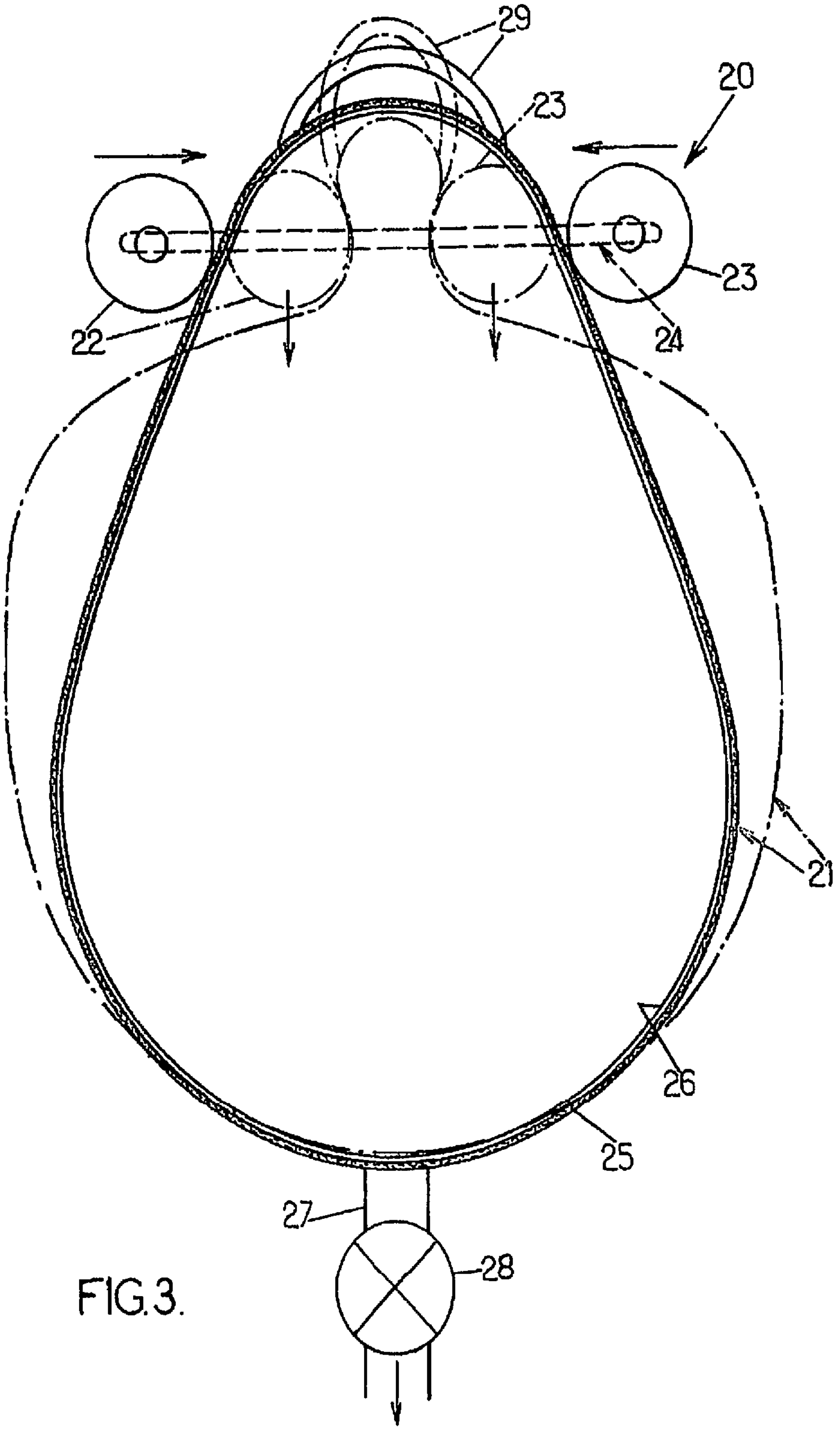
FIG. 3 represents a summary diagram of an embodiment of the drainage kit according to the invention.

FIG. 3 shows another embodiment of the drainage kit according to the invention. This kit comprises a draining device 20 and a flexible container 21 of overall pear shape.

The draining device 20 consist of one or two rollers 22, 23 connected to one another by a system of rods 24 allowing the distance between the axes of the rollers 22 and 23 to be varied.

The flexible container 21 comprises a mechanically strong wall 25 and an inner lining bag 26 adhesively bonded onto the inner face of the wall 25. This flexible container 21 is also equipped with an outlet conduit 27 in its lower part, associated with a mechanical collection means 28 consisting of a pump. Opposite, in the upper part, the flexible container 21 has a lifting or suspension handle 29.

The representation in solid lines in FIG. 3 corresponds to the situation of the drainage kit before pressurization, and the representation in dots and dashes corresponds to the situation of the drainage kit at the start of pressurization.

As symbolized by the horizontal arrows on the drawing, the rollers 22, 23 are brought toward each other so as to press the upper part of the flexible container 21. The rollers 22 and 23 brought together in this way subsequently commence their descent as symbolized by the vertical arrows. The flexible container 21 is thus pressed progressively from its upper end to its lower end. The viscous product which the container 21 contains is subjected to a pressure which depends on the strength of the container and flows through the outlet conduit 27. The extraction of this viscous product is facilitated by the use of the pump 28.

It can also be seen that the pressurization by the descending rollers 22, 23 has the effect of keeping the container 21 in an inflated state.

In practice, the handle 29 of the flexible container 21 is passed between the rollers 22, 23, and the handled 29 is lifted for example with a forklift truck. The rollers 22, 23 are tightened on either side of the upper part of the container by means of the system for a controlling the inter-axial distance 24. The rollers 22, 23 descend along the container under their own weight, pushing the viscous product downward until there is an equilibrium between the weight of the rollers and the reaction forces of the compressed container 21.

When the drainage outlet 27 is opened, the viscous product (for example silicone putty) flows and the rollers 22, 23 descend, progressively pressing the entire contents of the container 21.

This embodiment operates, for example, with a flow rate of about 35 liters per minute for a drainage opening having a diameter of 33 cm, with steel rollers having a diameter of 10 cm both weighing about 40 kg (steel rollers coated with rubber in order to adhere well to the flexible container). The inner lining bag of the flexible container 21 is fixed by adhesive bonding or stitching to the outer polypropylene fabric 25.

It is conceivable to provide mechanization of the system making it possible either to draw the container through the tightened rollers 22, 23 and/or to motorize the rotation of the rollers themselves. Such mechanization could only increase the outlet flow rate of the viscous product.

The use of a pump 28 makes it possible to increase the outlet flow rate of the viscous product significantly (×10).

Figure 4:
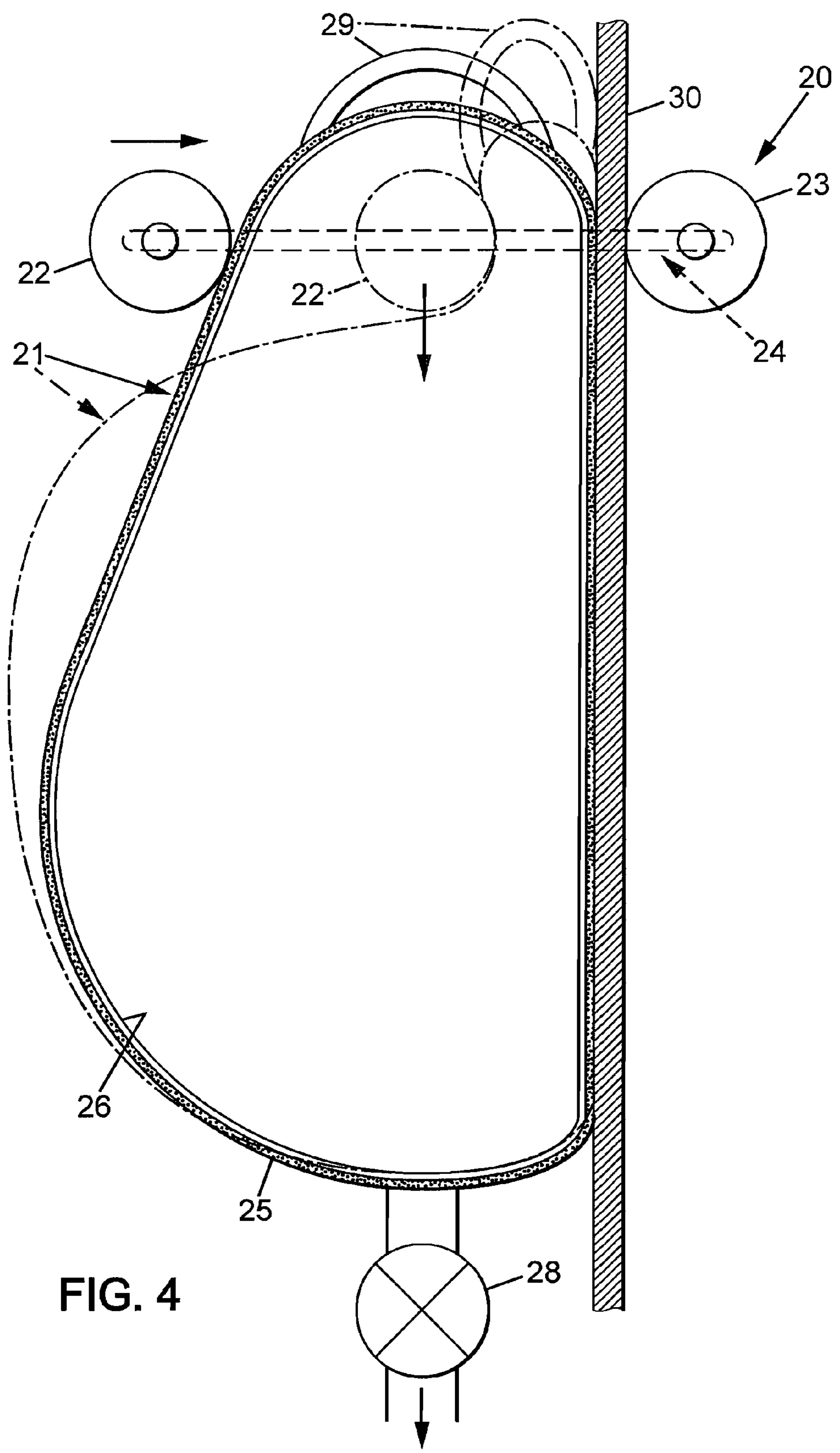
FIG. 4 represents a summary diagram of another embodiment of the drainage kit according to the invention.

FIG. 4 illustrates a variation of the embodiment illustrated in FIG. 3, in which the draining device 20 further includes a plate 30 which is inserted between flexible container 21 and counter-roller element 23. Plate 30 serves to balance the force of counter-roller element 23 over a larger surface area of flexible container 21.

The description of the first embodiment is supplemented by the following examples.

EXAMPLE 1

Example of Cartridging Silicone Putty from a Pressed Flexible Envelope

The device employed is that represented in FIG. 1 and described above. More precisely, this example uses a press with a vessel intended to drain viscous products contained in vessels with a diameter of up to 1240 mm, said vessels withstanding the working pressure.

This press has a steel structure, the structure holding a jack in a vertical position. The jack with a diameter of 20 cm is hydraulic and operates with from 0 to 250 bars of hydraulic pressure delivered by a hydraulic unit. The pressure piston, actuated by the jack, has a diameter of 1220 mm plus or minus 3 mm. A control station makes it possible to control the rise and descent of the jack.

The vessel used has an interior diameter of 1235 mm plus or minus 10 mm and a depth of 1000 mm, is made of stainless steel and withstands a pressure of more than 7 bar.

The outlet opening for the product is located in the bottom of the vessel, on the side.

A pressure-resistant and flexible hose connects the orifice of the vessel to the doser of the cartridger. The hose has a length of one meter and an interior diameter of 76 mm.

The big-bag tested is a circular fabric big-bag whose perimeter is 3640 mm, i.e. much less than the interior perimeter of the vessel. This big-bag has a flat cylindrical bottom, a full-opening polyethylene bag with a thickness of 100 microns not adhesively bonded to the big-bag but stitched to it at the intersection between the cylinder (body of the big-bag) and the upper disk closing the upper part of the big-bag. The big-bag has a filling spout placed on the upper disk of the big-bag, at 5 cm from the edge (this spout can be used to carry out "clean" drainage by being used as a drainage spout, thus protecting the orifice in the pressure plate against contamination). The upper disk and the spout are made of a polyethylene-coated fabric which is leaktight for the product contained. The flexible container contains 680 kg of product at the start of drainage.

The product contained in the flexible container for the test is a silicone putty of the Oxime type.

The vessel has wheels allowing it to move on a flat floor.

The product contained in the flexible container for the test is a silicone putty of the Acetoxy type.

The flexible container is placed in the vessel by a forklift truck. A polyethylene film is placed on the flexible container, followed by the rubber seal between the edges of the vessel.

The flexible container is pierced through the outlet orifice: the slot made measures about 10 cm.

The hose is connected to the outlet, then pressurization is carried out by lowering the jack.

The doser of the cartridger fills rapidly (time less than 1 second, close to 0.5 second).

The cartridger operates normally at 30 strokes per minute.

The loss of material at the bottom of the flexible container is 8.6 liters, i.e. 1.26%.

The vessel is for the most part clean: only the part close to the outlet orifice is contaminated, i.e. over a radius of about 25 cm.

EXAMPLE 2

Example of Draining Silicone Putty from a Pressed Flexible Envelope

The device employed is that represented in FIG. 1 and described above. More precisely, this example uses a press with a vessel intended to drain viscous products contained in vessels with a diameter of up to 1240 mm, said vessels withstanding the working pressure.

This press has a steel structure, the structure holding a jack in a vertical position. The jack with a diameter of 20 cm is hydraulic and operates with from 0 to 250 bars of hydraulic pressure delivered by a hydraulic unit. The pressure piston, actuated by the jack, has a diameter of 1220 mm plus or minus 3 mm. A control station makes it possible to control the rise and descent of the jack.

The vessel used has an interior diameter of 1235 mm plus or minus 10 mm and a depth of 1000 mm, is made of stainless steel and withstands a pressure of more than 7 bar.

The outlet opening for the product is located in the pressure plate, on the side, at about 15 cm from the edge of the plate.

A pressure-resistant steel tube is used for conveying from the outlet office of the plate to above a drainage receptacle. The tube is fixed to the orifice of the pressure plate by a leaktight connector. The tube has a total length of 2.5 meters and an interior diameter of 76 mm.

The big-bag tested is a circular fabric big-bag with offset straps, having a height of 1100 mm, its perimeter being 3640 mm i.e. much less than the interior perimeter of the vessel. This big-bag has a flat cylindrical bottom, a full-opening polyethylene bag with a thickness of 100 microns not adhesively bonded to the big-bag but stitched to it at the intersection between the cylinder (body of the big-bag) and the upper disk closing the upper part of the big-bag. The big-bag has a filling spout placed on the upper disk of the big-bag, at 5 cm from the edge. The upper disk and the spout are made of a polyethylene-coated fabric which is leaktight for the product contained. The flexible container contains 680 kg of product at the start of drainage.

The vessel has wheels allowing it to move.

The product contained in the flexible container for the test is a silicone putty of the acetoxy type.

The flow rate obtained at the outlet of the tube is more than 70 liters per minute, oscillating predominantly around the value 120 liters per minute with a maximum of 145 liters per minute, this being from oil pressure of 220 bar in the jack (which corresponds to about 5.7 bar in the vessel).

The presence of a filtering grille in the pipe also limits the flow rate, which could therefore be higher without this grille.

The flexible container weighed after drainage has a mass of 12 kg. The flexible container weighs 2 kg when empty. The loss of material is therefore 10 kg, i.e. 1.47%.

EXAMPLE 3

Example of Cartridging Silicone Putty from a Pressed Flexible Envelope

The device employed is that represented in FIG. 1 and described above. More precisely, this example uses a vessel press for a rigid vessel, which withstands the working pressure, with a diameter of up to 1240 mm.

This press has a steel structure, the structure holding a jack in a vertical position. The jack with a diameter of 20 cm is hydraulic and operates with from 0 to 250 bars of hydraulic pressure delivered by a hydraulic unit. The pressure piston, actuated by the jack, has a diameter of 1220 mm plus or minus 3 mm. A control station makes it possible to control the rise and descent of the jack.

The vessel used has an interior diameter of 1235 mm plus or minus 10 mm and a depth of 1000 mm, is made of stainless steel and withstands a pressure of more than 10 bar.

The outlet opening for the product is located in the bottom of the vessel, on the side.

A pressure-resistant and flexible hose connects the orifice of the vessel to the doser of the cartridger. The hose has a length of one meter and an interior diameter of 76 mm.

The big-bag tested is a circular fabric big-bag whose perimeter is 3640 mm, i.e. much less than the interior perimeter of the vessel. This big-bag has a flat cylindrical bottom, a polyethylene bag with a thickness of 100 microns not adhesively bonded to the big-bag but stitched to it at the intersection between the cylinder (body of the big-bag) and the upper disk closing the upper part of the big-bag. The big-bag has a filling spout which is used as a drainage spout, placed on the upper disk of the big-bag, at 5 cm from the edge, for drainage via the top through an orifice in the pressure plate. The upper disk and the spout are made of a polyethylene-coated fabric which is leaktight for the product contained.

The product contained in the flexible container for the test is a silicone putty of the Oxime type.

The invention claimed is:

1. A method of draining a flexible container holding a viscous product, comprising:

selecting the viscous product, having a viscosity of at least 50 Pa·s, from the group consisting of polyorganosiloxane compositions which can be crosslinked to form elastomers by polyaddition, polycondensation or dehydro (poly)condensation reactions, organic polymers comprising reactive organosilicic groups (referred to as MS polymers) and compositions which are charged in a solvent or aqueous medium, comprise an acrylic polymer and can be crosslinked to form elastomers by drying;

said method further comprising:

using a flexible container of the big-bag type having a capacity greater than 250 liters;

ensuring that at least one outlet opening, arranged in a lower part of the container, allows the viscous product to flow out of the container;

exerting a pressure on at least one delimited region of the flexible container with the aid of a draining device so as to keep the container in an inflated or partially inflated state and to accelerate the flow;

depressurizing at the end of draining, wherein said draining device comprises at least one pressure member having at least one set of (i) at least one roller and (ii) at least one counter-roller element, said roller and counter-roller element rotate about their respective axes, and a device for suspending the flexible container so that the opening(s) is (are) arranged at the bottom; the assembly being designed so that the roller and counter-roller element move in the downward direction while rolling and compressing the flexible container as it moves between the roller and counter-roller element.

2. A kit for carrying out the method of claim 1, comprising a viscous product having a viscosity greater than or equal to 50 Pa·s, selected from the group consisting of polyorganosiloxane compositions which can be crosslinked to form elastomers by polyaddition, polycondensation or dehydro(poly)condensation reactions, organic polymers comprising reactive organosilicic groups (referred to as MS polymers) and compositions which are charged in a solvent or aqueous medium, comprise an acrylic polymer and can be crosslinked to form elastomers by drying;

a mechanically strong flexible container which is leaktight for said viscous product and which is of the big-bag type having a capacity greater than 250 liters;

a draining device comprising at least one pressure member and/or at least one pressure fluid;

wherein the draining device comprises a pressure member having at least one set of (i) at least one roller and (ii) at least one counter-roller element, said roller and counter-roller element rotate about their respective axes and a device for suspending the flexible container so that an opening(s) is (are) arranged at the bottom; the assembly being designed so that the roller and counter-roller element can move in the downward direction while rolling and compressing the flexible container as it moves between said roller and counter-roller element.

3. The kit of claim 2, wherein:

the flexible container is equipped in its upper part with at least one gripping handle for suspending it and, in its lower part, with at least one outlet opening for the viscous product, the container advantageously having an overall pear shape whose flared part forms the base;

and the roller and are adapted to be arranged on either side of the flexible container so as to squeeze it while moving in the downward direction, said pressure member being provided with a system for regulating an inter-axial distance so as to adapt the squeezing pressure exerted on the flexible container.

4. The kit of claim 2, wherein the flexible container has a capacity between 500 and 2,000 liters.

5. The kit of claim 2, wherein the wall of the container is mechanically strong and leaktight for the viscous product, and wherein it comprises:

at least one element which provides mechanical strength and includes one or more sheets of materials which are identical to or different than one another;

and at least one sealing element formed (i) by at least one polymer film, in the form of a coating and/or (2i) by at least one leaktight lining bag composed of one or more layers of materials selected from the group comprising synthetic polymer film and metal; the lining bag(s) being at least partially secured to the wall element providing the mechanical strength.

6. The kit of claim 5, wherein said synthetic polymer film is selected from the group consisting of polyolefins, polyesters and polyamides.

7. The kit of claim 6, wherein said polyolefins are selected from the group consisting of polyethylene and polypropylene.

8. The kit of claim 5, wherein said metal comprises aluminum.

9. The kit of claim 2, wherein the flexible container has a mechanically strong and leaktight wall made from fabric(s) whose weight in the uncoated state lies in the interval ranging from 100 to 300 g/m2, and wherein the lining bag has a thickness lying in the interval ranging from 5 to 500 microns.

10. The kit of claim 2, wherein the viscous product has a viscosity greater than 100 Pa·s.

11. The kit of claim 2, wherein the viscous product comprises a silicone putty.

12. The kit of claim 2, wherein the draining device further comprises a plate or a flat support adapted to be inserted between said flexible container and said at least one counter-roller element.

13. The method of claim 1, wherein the flexible container has a capacity between 500 and 2,000 liters.

14. The method of claim 1, wherein the wall of the container is mechanically strong and leaktight for the viscous product, and wherein it comprises:

at least one element which provides mechanical strength and includes one or more sheets of materials which are identical to or different than one another;

and at least one sealing element formed (i) by at least one polymer film, in the form of a coating and/or (2i) by at least one leaktight lining bag composed of one or more layers of materials selected from the group comprising synthetic polymer film and metal; the lining bag(s) being at least partially secured to the wall element providing the mechanical strength.

15. The method of claim 14, wherein said synthetic polymer film is selected from the group consisting of polyolefins, polyesters and polyamides.

16. The method of claim 15, wherein said polyolefins are selected from the group consisting of polyethylene and polypropylene.

17. The method of claim 14, wherein said metal comprises aluminum.

18. The method of claim 1, wherein the flexible container has a mechanically strong and leaktight wall made from fabric(s) whose weight in the uncoated state lies in the interval ranging from 100 to 300 g/m2, and wherein the lining bag has a thickness lying in the interval ranging from 5 to 500 microns.

19. The method of claim 1, wherein the viscous product is expelled from the flexible container at a flow rate greater than 50 liters per minute.

20. The method of claim 1, wherein the viscous product has a viscosity greater than 100 Pa·s.

21. The method of claim 1, wherein the viscous product comprises a silicone putty.

22. The method of claim 1, wherein the draining device further comprises a plate or a flat support adapted to be inserted between said flexible container and said at least one counter-roller element.

* * * * *